US007952226B2

(12) United States Patent
Tessier et al.

(10) Patent No.: US 7,952,226 B2
(45) Date of Patent: May 31, 2011

(54) INSULATING CONTROL DEVICE AND METHOD FOR VEHICLE PROXIMITY REMOTE

(75) Inventors: Martin Tessier, Quebec (CA); Patrick Noel, Ste-Marthe-sur-le-Lac (CA); Jean-Pierre Aubertin, Laval (CA); Cristinel Zaharia, Montreal (CA); Duc Mihn Cong Nguyen, Montreal (CA); Darren Victor Satkunas, Verdun (CA)

(73) Assignee: Fortin Auto Radio Inc., Saint-Léonard (CA)

( * ) Notice: Subject to any disclaimer, the term of this patent is extended or adjusted under 35 U.S.C. 154(b) by 183 days.

(21) Appl. No.: 12/168,557

(22) Filed: Jul. 7, 2008

(65) Prior Publication Data

US 2009/0008125 A1 Jan. 8, 2009

Related U.S. Application Data

(60) Provisional application No. 60/948,039, filed on Jul. 5, 2007.

(30) Foreign Application Priority Data

Sep. 5, 2007 (CA) ........................... 2592981

(51) Int. Cl.
*B60R 25/00* (2006.01)

(52) U.S. Cl. ...................................................... 307/10.2
(58) Field of Classification Search .......... 307/9.1–10.8; 340/500, 531, 539.1, 425.5–426.36
See application file for complete search history.

(56) References Cited

U.S. PATENT DOCUMENTS

| 5,892,500 | A  | * | 4/1999  | Kang et al.    | 345/157   |
| 7,229,041 | B2 | * | 6/2007  | Cohen et al.   | 241/285.3 |
| 7,301,441 | B2 | * | 11/2007 | Inada et al.   | 340/426.13|
| 7,386,869 | B1 | * | 6/2008  | Bastien et al. | 725/6     |
| 7,420,460 | B2 | * | 9/2008  | Chen et al.    | 340/425.5 |

* cited by examiner

*Primary Examiner* — Albert W Paladini
(74) *Attorney, Agent, or Firm* — Goudreau Gage Dubuc; Gonzalo Lavin

(57) ABSTRACT

A system and method for controlling the radio frequency emissions of a proximity remote keyless system for permitting or denying remote access to premises of a vehicle. The source power is controlled to thereby control when the vehicle is authorized to start. The proximity remote can thus be left in the vehicle and controlled by another external source. The device of the invention is adapted to be inserted between a battery, which powers the proximity remote, and insulates the battery from an associated battery base contact. The device comprises a conductive contact on opposite sides of an insulating plate and at least one wire connected to each conductive contact. The wires can be connected to an external device, thus allowing external electrical or mechanical control of the proximity remote, with the proximity remote being only able to transmit to the vehicle if the battery is connected to the battery base contact.

20 Claims, 2 Drawing Sheets

INSULATING CONTROL DEVICE AND METHOD FOR VEHICLE PROXIMITY REMOTE

CROSS REFERENCE TO RELATED APPLICATIONS

This application claims priority on U.S. Provisional Application No. 60/948,039, and Canadian Patent Application No. 2,592,981 both filed on Jul. 5, 2007 and which are herein incorporated by reference in their entirety.

FIELD OF THE INVENTION

The present invention relates to remote starters for vehicles. In particular, the invention relates to an insulating control device and method for insulating the battery of a remote starter from the battery's base contact.

BACKGROUND OF THE INVENTION

New technologies in the domain of the automotive security restrain the installation of remote starters in some vehicles. In some cases, the after-market products are not compatible with these automotive innovations. Formerly, the driver would mechanically insert a key in the barrel in order to start the vehicle. Today, many vehicles electronically validate the key that the driver is attempting to use to start the vehicle and either is permissive and allows the vehicle to start, or is restrictive and inhibits the vehicle from starting. In this case, the key or proximity remote is able to communicate to the vehicle using radio signals. If the pre-programmed key or remote is not within proximity when the driver attempts to start the vehicle various countermeasures inhibit the vehicle from starting. However, if a valid proximity remote was left somewhere within the vehicle, the vehicle would never inhibit itself from starting thus allowing anyone to start the vehicle at any time.

What is therefore needed, and an object of the present invention, is an insulating control device and method for insulating a proximity remote's battery from the battery's base contact, thus inhibiting a vehicle from starting as desired.

SUMMARY OF THE INVENTION

According to a first aspect of the present invention, there is provided an insulating control device for controlling a transmission of electrical signals by a proximity remote to a receiver for regulating a remote access to premises of a vehicle, the proximity remote powered by a battery mounted therein on a battery base contact. The insulating control device comprises an insulating control plate adapted to be inserted within the proximity remote between the battery and the battery base contact and at least two conductive contacts connected to the insulating control plate for controlling an electrical conductivity between the at least two conductive contacts to alternatively connect and disconnect the battery from the battery base contact, thereby respectively permitting and inhibiting the transmission.

According to an another aspect of the present invention, there is provided a method for controlling a transmission of electrical signals by a proximity remote to a receiver for regulating a remote access to premises of a vehicle, the proximity remote powered by a battery mounted therein on a battery base contact. The method comprises providing an insulating control device comprising an insulating control plate with at least two conductive contacts connected thereto, inserting the insulating control device within the proximity remote between the battery and the battery base contact, and controlling an electrical conductivity between the at least two conductive contacts to alternatively connect and disconnect the battery from the battery base contact, thereby respectively permitting and inhibiting the transmission.

The invention as well as its numerous advantages will be better understood by reading of the following non-restrictive description of preferred embodiments made in reference to the appended drawings.

DESCRIPTION OF PREFERRED EMBODIMENTS

Figure 1:
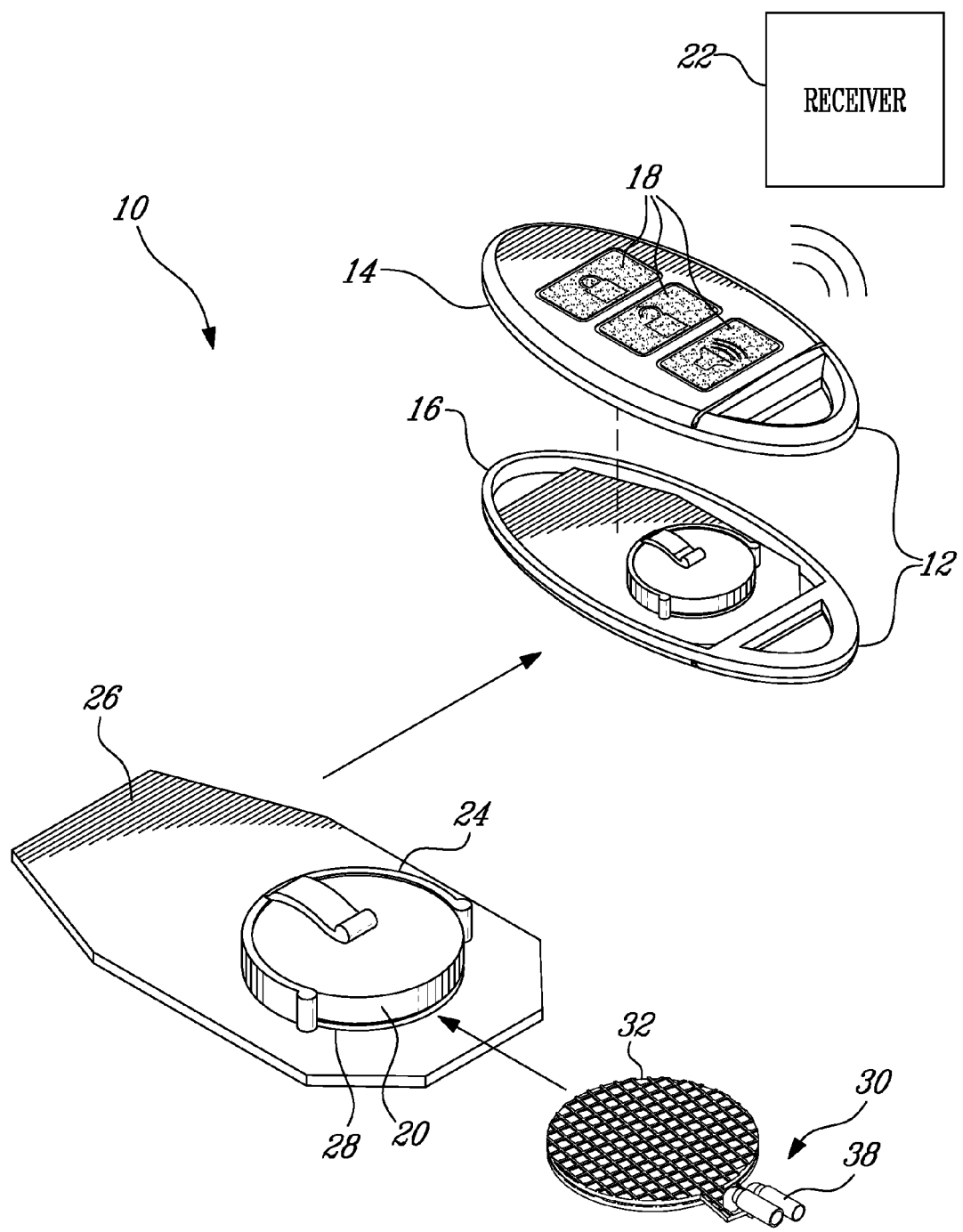
FIG. 1 is a perspective view of an insulating control device being placed within a proximity remote, according to a preferred embodiment of the present invention.

Referring now to FIG. 1, and in accordance with an illustrative embodiment of the present invention, a proximity remote keyless system, generally referred to using the reference numeral 10, will now be described. The proximity remote 10 permits or denies access from a distance to premises of a vehicle (not shown), illustratively an automobile, and is contained in a key fob 12 illustratively formed by two (2) mated half shells 14 and 16. A plurality of buttons as in 18 dedicated to starting the vehicle, locking or unlocking the doors and opening the trunk (not shown) of the vehicle are also provided on an outer surface of the key fob 12. According to a preferred aspect of the present invention, the proximity remote 10 is powered by one or more batteries as in 20, which enable the proximity remote 10 to transmit information (e.g. in the form of radio frequency emissions) to a remote receiver 22. The remote receiver 22 is illustratively a component within the vehicle, which is adapted to receive information from the proximity remote 10 so as to allow the vehicle to start only after an expected, valid or properly formed radio wave has been received from the proximity remote 10.

Still referring to FIG. 1, the battery 20 is illustratively mounted on a base contact or clip 24 used to maintain the placement of the battery 20 and ensure a closed (i.e. connected) power circuit (not shown) between the battery 20 and the base contact 24, as it is impossible for the proximity remote 10 to transmit information to the receiver 22 when the power circuit is open (i.e. disconnected). The battery 20 and associated base contact 24 are further illustratively mounted on a printed circuit board 26 powered by the battery 20 to transmit information related to the presence of the proximity remote 10 to the vehicle. Another battery base contact 28, which acts as a conductor and is synonymous to the base contact 24, may further be positioned opposite to the latter. The battery base contact 28, may illustratively be another clip similar to base contact 24, an electrical lead or a printed area on the printed circuit board 26 for conducting power from the battery 20 to the printed circuit board 26.

Figure 2:
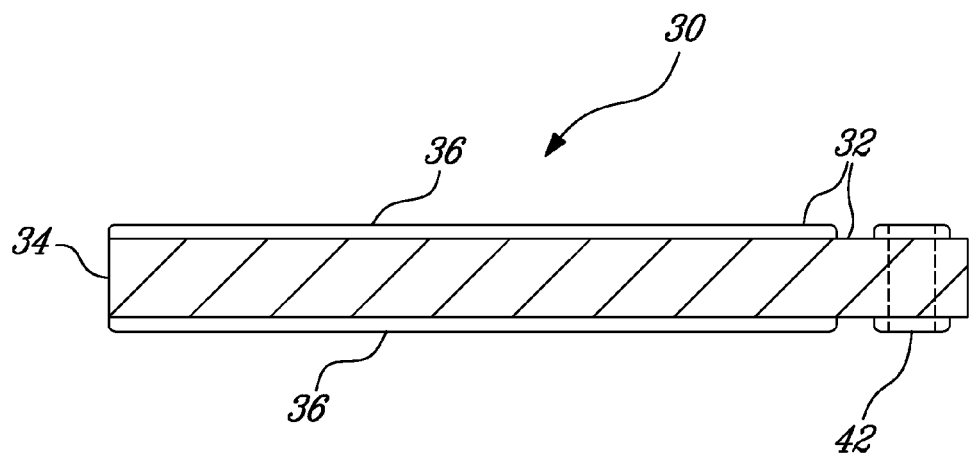
FIG. 2 is a side section view of an insulating control device, according to a preferred embodiment of the present invention.

Referring now to FIG. 2 in addition to FIG. 1 and according to a preferred aspect of the present invention, the battery 20 of the proximity remote 10 is insulated from the base contact 24 by an insulating control device 30. The insulating control device 30 illustratively includes a membrane 32 that is inserted within the key fob 12 of the proximity remote 10 between the battery 20 and the base contact 24 so as to open (disconnect) the power circuit thus preventing the proximity remote 10 from transmitting radio frequencies to the proximity remote receiver 22. Preferably, the membrane 32 of the insulating control device 30 comprises an insulating control plate 34 positioned between two (2) conductive contacts as in 36 provided on opposite sides thereof. The insulating plate 34, which is made of a suitable insulated material, such as FR4, mica, and/or plastic, isolates the electrical conductivity between the conductive contacts 36. One side of the insulating plate 34 and associated conductive contact 36 illustratively makes contact with the battery 20 while the other side makes contact with either the base contact 24, the printed circuit board 26, a wire (not shown), or any other type of conductive lead (not shown). If more than one battery 20 is used, both sides of the insulating plate 34 and associated conductive contacts 36 can make contact with separate batteries as in 20. Moreover, the insulating control device 30 is illustratively bipolar, which enables either side thereof to make contact with either a positive or negative polarity of the battery 20 thus allowing it to be reversed.

Figure 3:
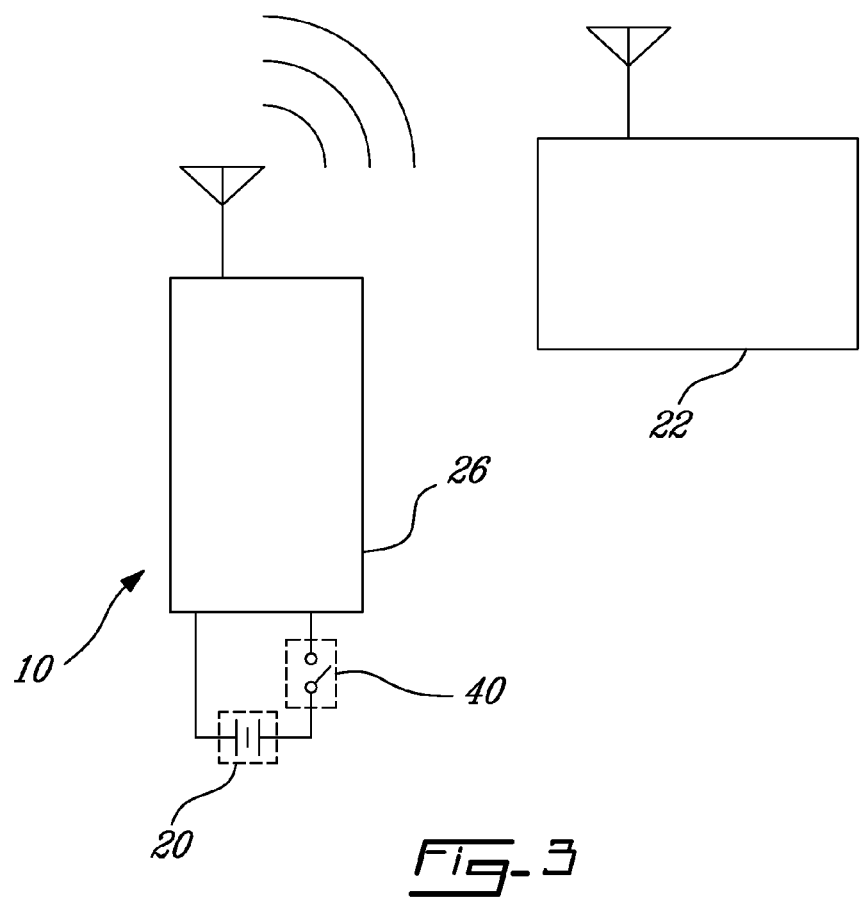
FIG. 3 is a schematic electrical representation of the device of FIG. 1, according to a preferred embodiment of the present invention.

Referring now to FIG. 3, in addition to FIG. 1 and FIG. 2, a pair of contact wires as in 38 is illustratively used to provide conductivity between both conductive contacts as in 36 on either side of the insulating plate 34. In this manner, when conductivity is provided between both conductive contacts as in 36, insertion of the insulating control device 30 between the battery 20 and the base contact 24 results in the insulating plate 34 and associated conductive contacts as in 36 physically isolating and electrically opening the closed power circuit of the proximity remote 10, thus achieving power control. Indeed, as illustrated in FIG. 3, the insulating control device 30 acts as a power control 40, which can be simplified and electrically represented as a Single Pole Single Throw (SPST) switch, that controls the opening and closing of the proximity remote power circuit between the battery 20 and the printed circuit board 26, as discussed further herein below.

Still referring to FIG. 1 and FIG. 2, a wire solder pad 42 may further be used to solder one or more of the external wires as in 38 (or a header pin for a plug, not shown) to each of the conductive contacts as in 36. As illustrated, the pad 40 may either have a hole through a layer of the conductive contacts as in 36 and the insulating plate 34, or have a bare surface on one of the conductive contacts as in 36 so that a wire 38 can be connected directly thereto. It is therefore possible to connect the wires as in 38 externally while conserving the integrity of the original printed circuit board and electronic components of the proximity remote 10, thus preventing damage to original electronic components therewithin. As a result, the insulating control device 30 can be removed from the key fob 12 at a later time yet allow the proximity remote 10 to still be used without requiring it to be repaired or replaced.

Still referring to FIG. 1 and FIG. 2, when wires as in 38 are connected to the pad 42, the proximity remote 10 illustratively functions normally and transmits radio frequencies to notify the receiver 22 in the vehicle of a presence of the proximity remote 10. The wires as in 38 may illustratively be connected and disconnected (i.e. respectively closed and opened) mechanically via one or more relays (not shown) by an external controller device (not shown) such as a remote starter or some other after-market control module that attempts at starting the vehicle. Alternatively, the wires as in 38 may be connected and disconnected electrically with an electronic circuit, which in turn closes and opens the power circuit of the proximity remote 10. The insulating control device 30 therefore advantageously enables to activate and deactivate the proximity remote 10 externally by connecting and disconnecting the wires as in 38 from the conductive contacts as in 36, thus enabling control of when the proximity remote 10 authorizes the vehicle to start. Control of the radio frequency emissions by the proximity remote 10 is therefore provided by controlling the power source thereof, thus allowing the proximity remote 10 to for example be left within the vehicle and controlled by an external source to inhibit the vehicle from starting.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. An insulating control device for controlling a transmission of electrical signals by a proximity remote to a receiver for regulating a remote access to premises of a vehicle, the proximity remote powered by a battery mounted therein on a battery base contact, the insulating control device comprising:
    an insulating control plate adapted to be inserted within the proximity remote between the battery and the battery base contact; and
    at least two conductive contacts connected to said insulating control plate for controlling an electrical conductivity between said at least two conductive contacts to alternatively connect and disconnect the battery from the battery base contact, thereby respectively permitting and inhibiting the transmission.

2. The insulating control device according to claim 1, wherein said at least two conductive contacts are positioned at opposite sides of said insulating control plate.

3. The insulating control device according to claim 1, wherein said insulating control plate is manufactured from an insulated material selected from the group consisting of FR4, mica, and plastic.

4. The insulating control device according to claim 2, wherein a first one of said opposite sides makes contact with the battery and a second one of said opposite sides makes contact with the battery base contact.

5. The insulating control device according to claim 2, further comprising a printed circuit board onto which the battery and the battery base contact are mounted and wherein a first one of said opposite sides makes contact with the battery and a second one of said opposite sides makes contact with said printed circuit board.

6. The insulating control device according to claim 2, further comprising a second battery for powering the proximity remote and wherein a first one of said opposite sides makes contact with the battery and a second one of said opposite sides makes contact with said second battery.

7. The insulating control device according to claim 2, wherein the insulating control device is bipolar for allowing each one of said opposite sides to alternatively make contact to a positive and a negative polarity of the battery, thereby enabling a reversal of the battery.

8. The insulating control device according to claim 1, further comprising a first wire and a second wire each connected to a respective one of said at least two conductive contacts for controlling said electrical conductivity.

9. The insulating control device according to claim 8, further comprising a controller attached externally of the proximity remote to said first and said second wire for alternatively connecting and disconnecting said first and said second wire and accordingly the battery and the battery base contact.

10. The insulating control device according to claim 9, wherein when said first and said second wire are connected, the battery and the battery base contact are connected and the transmission is permitted.

11. The insulating control device according to claim 8, further comprising a wire solder pad for soldering said first and said second wire to said respective one of said at least two conductive contacts.

12. The insulating control device according to claim 11, wherein said wire solder pad comprises an aperture through a layer of said at least two conductive contacts and said insulating control plate.

13. The insulating control device according to claim 12, wherein said wire solder pad comprises a bare surface on one of said at least two conductive contacts.

14. A method for controlling a transmission of electrical signals by a proximity remote to a receiver for regulating a remote access to premises of a vehicle, the proximity remote powered by a battery mounted therein on a battery base contact, the method comprising:
providing an insulating control device comprising an insulating control plate with at least two conductive contacts connected thereto;
inserting said insulating control device within the proximity remote between the battery and the battery base contact; and
controlling an electrical conductivity between said at least two conductive contacts to alternatively connect and disconnect the battery from the battery base contact, thereby respectively permitting and inhibiting the transmission.

15. The method according to claim 14, further comprising positioning said at least two conductive contacts at opposite sides of said insulating control plate.

16. The method according to claim 15, wherein said inserting said insulating control device within the proximity remote comprises making a first one of said opposite sides contact the battery and a second one of said opposite sides contact the battery base contact.

17. The method according to claim 15, further comprising providing a printed circuit board onto which the battery and the battery base contact are mounted and wherein a first one of said opposite sides makes contact with the battery and a second one of said opposite sides makes contact with said printed circuit board.

18. The method according to claim 15, further comprising providing a second battery for powering the proximity remote and wherein a first one of said opposite sides makes contact with the battery and a second one of said opposite sides makes contact with said second battery.

19. The method according to claim 14, wherein said controlling an electrical conductivity between said at least two conductive contacts comprises providing a first wire and a second wire each connected to a respective one of said at least two conductive contacts, and further wherein when said first and said second wire are connected, the battery and the battery base contact are connected and the transmission is permitted.

20. The method according to claim 19, wherein said controlling an electrical conductivity between said at least two conductive contacts comprises providing a controller attached externally of the proximity remote to said first and said second wire for alternatively connecting and disconnecting said first and said second wire and accordingly the battery and the battery base contact.

* * * * *